United States Patent
Unoki et al.

[11] Patent Number: 5,897,683
[45] Date of Patent: Apr. 27, 1999

[54] METHOD AND APPARATUS FOR HOLDING MOLTEN METAL

[75] Inventors: Kenichi Unoki; Ritsuo Hashimoto; Noriyuki Kawata; Yasuo Hukada, all of Hiroshima; Chiaki Kato; Toshitane Matsukawa, both of Chiba, all of Japan

[73] Assignees: Mitsubishi Jukogyo Kabushiki Kaisha, Tokyo; Kawasaki Steel Corporation, Hyogo, both of Japan

[21] Appl. No.: 08/860,591

[22] PCT Filed: Nov. 8, 1996

[86] PCT No.: PCT/JP96/03276

§ 371 Date: Jul. 8, 1997

§ 102(e) Date: Jul. 8, 1997

[87] PCT Pub. No.: WO97/17477

PCT Pub. Date: May 15, 1997

[30] Foreign Application Priority Data

Nov. 10, 1995 [JP] Japan ................................. 7-292478
Nov. 10, 1995 [JP] Japan ................................. 7-292479

[51] Int. Cl.[6] ............... C22B 4/00; B05C 3/02; B05C 5/02; B05D 1/18
[52] U.S. Cl. .................. 75/10.14; 75/10.67; 118/405; 118/623; 427/431; 427/433

[58] Field of Search ................. 118/405, 623; 75/10.14, 10.67; 204/243 M, 246; 205/369, 230; 427/431, 433

[56] References Cited

U.S. PATENT DOCUMENTS

| | | | |
|---|---|---|---|
| 5,071,471 | 12/1991 | Miki et al. | ............. 75/10.14 |
| 5,106,411 | 4/1992 | Miki et al. | ......... 75/10.67 X |
| 5,662,969 | 9/1997 | Ling | .................... 118/405 X |
| 5,665,437 | 9/1997 | Frommann et al. | ........ 118/405 X |

FOREIGN PATENT DOCUMENTS

| | | |
|---|---|---|
| 63A-109148 | 5/1988 | Japan. |
| 63A-317656 | 12/1988 | Japan. |
| A 004356 | 1/1992 | Japan. |
| A7-48660 | 2/1995 | Japan. |

*Primary Examiner*—Donald R. Valentine
*Attorney, Agent, or Firm*—Birch, Stewart, Kolasch & Birch, LLP

[57] ABSTRACT

An apparatus for holding molten metal in a container having an opening at the bottom thereof comprising an electromagnet for generating a horizontal magnetic field in a lower part of the molten metal in the container and a conductive block for guiding part of eddy currents induced in the molten metal by the generation of the horizontal magnetic field, to flow outside the molten metal.

9 Claims, 8 Drawing Sheets

VIEW ALONG ARROW A

Fig. 5

VIEW ALONG ARROW B     VIEW ALONG ARROW C

METHOD AND APPARATUS FOR HOLDING MOLTEN METAL

This is a national stage application of PCT/JP96/031, filed Nov. 8, 1996.

FIELD OF THE INVENTION

This invention relates to a method and an apparatus for holding molten metal in a container and is specifically concerned with a molten metal plating apparatus using the holding apparatus.

BACKGROUND OF THE INVENTION

In facilities for plating by passing a material to be plated through a bath of molten metal such as zinc or aluminum, a conductive liquid, the molten metal is held by a method as described in Japanese Laid-Open Patent Publication No. 356/92. In this method an opening portion is provided at the bottom of an aerial pot from a material poorly wettable by molten metal, and utilizes the surface tension of the molten metal to hold the molten metal inside the aerial pot. This method is limited in increasing the height of the molten metal that can be held.

To achieve an increased height of molten metal which can be held in a container Japanese Laid-Open Patent Publication No. 109148/88 discloses a technique of providing a pressure chamber for accommodating a gas under the container storing molten metal. This technique involves a pressure chamber containing gas connected to an opening at the bottom of the molten metal container, and raising the gas pressure inside the pressure chamber, thereby increasing the height of the molten metal held in the molten metal container. The technology disclosed in this publication, however, has the disadvantage that even when the pressure (gravitational) of the molten metal at the opening balances statically with the gas pressure inside the pressure chamber, the difference in density between the gas and the molten metal causes the gas to penetrate the molten metal as bubbles and go up through the molten metal.

To obtain a plating of satisfactory quality by passing a material to be plated through molten metal, it is desired that the height of the molten metal be kept high and constant, and avoid gas bubbles in the molten metal.

An object of the present invention is to enable molten metal to be held at a predetermined height in a container with an opened bottom.

Another object of the invention is to prevent the formation of gas bubbles in molten metal.

Still another object of the invention is to produce a plating of satisfactory quality by hot dipping.

DISCLOSURE OF THE INVENTION

The present invention concerns an apparatus for holding molten metal, which comprises a magnetic field generating means for generating a horizontal magnetic field in a lower part of molten metal in a container to hold the molten metal in the container by an electromagnetic force; and a conductive block constructed such that eddy currents induced in the molten metal partly flow outside the molten metal. The conductive block is composed of block portions provided at sites where the horizontal magnetic field generated by the magnetic field generating means abruptly changes, and a connecting portion for connecting together the block portions outside the molten metal.

According to this invention, molten metal in the container is held by an electromagnetic force from a horizontal magnetic field generated by a magnetic field generating means. Eddy currents induced in the molten metal are partly guided by a conductive block to flow outside the molten metal. Thus, the amount of electric currents flowing in the molten metal decreases, thereby diminishing a downward force acting on the molten metal. The decrease in the amount of electric currents flowing in the molten metal can also suppress the rise in the temperature of the molten metal due to Joule heat. Therefore, the height of the molten metal can be maintained higher than when the conductive block is absent.

The present invention also pertains to an apparatus for holding molten metal, characterized in that a pressure chamber for holding a gas for imparting pressure to the bottom surface of the molten metal is provided under the container.

The present invention also concerns an apparatus for holding molten metal, which comprises a container for accommodating molten metal, the container having an opening for passage of a material at the bottom thereof; an electromagnet disposed at a lower part of the container to generate a horizontal magnetic field at a lower part of the molten metal; a conductive block comprising block portions provided in the container and close to the ends of cores of the electromagnet, and a connecting portion for connecting together the block portions outside the molten metal; and a pressure chamber provided connected to the bottom of the container containing a gas for imparting pressure to the bottom surface of the molten metal.

According to the apparatus for holding molten metal the present invention pertains to, molten metal in a container is held in the container by an electromagnetic force and pressure exerted on the bottom surface of the molten metal. Furthermore, Lorentz force in a direction opposite to the direction of the acceleration of gravity occurs in the vicinity of the bottom surface of the conductive liquid in the container by the action of the magnetic field generating means. Thus, the apparent acceleration of gravity can be directed upwards. Under this situation, even if the gas in the pressure chamber is about to enter the molten metal, the force due to the difference in density between the gas and the molten metal works downwards, with the result that the gas never ascends as bubbles in the molten metal. By increasing the gas pressure inside the pressure chamber, therefore, a stable height of molten metal can be maintained.

The present invention also relates to an apparatus for holding molten metal, which comprises a container for storing molten metal, the container having an opening at the bottom thereof; a magnetic field generating means for generating a horizontal magnetic field at a lower part of the molten metal to exert an electromagnetic force on the molten metal in the container, thereby holding the molten metal; a conductive block having block portions at those sites in the container where the horizontal magnetic field generated by the magnetic field generating means abruptly changes, whereby eddy currents are guided while flowing outside the molten metal; and an inlet portion and an outlet portion for the molten metal, the inlet and outlet portions being provided in the container outwardly of the opening and inwardly of the block portions of the conductive block.

According to this invention, molten metal can be held in the container by an electromagnetic force, and eddy currents induced in the molten metal can be partly guided to outside of the molten metal. In addition, the inlet portion for feeding of molten metal into the container, and the outlet portion for discharge of molten metal from the container are provided outwardly of the opening and inwardly of the block portions of the conductive block. Thus, molten metal can flow without interference by the block portions, so that the molten metal heated by Joule heat can be circulated.

In the apparatus for holding molten metal constructed as described above, the conductive block is disposed near the ends of the cores where the magnetic flux density abruptly changes, thereby making it possible to prevent the occurrence of a flow (vortex) of liquid, if present there, by an electromagnetic force. Moreover, the opening of the container is provided inwardly of, and fully apart from, the conductive block. Hence, the flow velocity component in the vertical direction at the opening can be made small, and the molten metal can be held stably in an aerial condition. Inwardly of the conductive block (toward the opening), the inlet and outlet for molten metal are provided. Thus, molten metal Joule heated in compensation for the electromagnetic force can be discharged outside of the core without being interrupted by the block. After the molten metal is cooled, it can be circulated into the core through the inlet.

The present invention also concerns a molten zinc plating apparatus, comprising a container for storing molten zinc as molten metal, and for allowing a steel strip to be continuously passed upward through an opening provided at the bottom thereof; a magnetic field generating means for generating a horizontal magnetic field in a lower part of the molten zinc to hold the molten zinc in the container by an electromagnetic force; and a conductive block constructed such that eddy currents induced in the molten metal flow outside the molten zinc.

The conductive block is composed of block portions provided at sites where the horizontal magnetic field generated by the magnetic field generating means abruptly changes, and a connecting portion for connecting together the block portions outside the molten zinc. Below the container, there is provided a pressure chamber for holding a gas for imparting pressure to the bottom surface of the molten zinc in the container.

To hold a sufficient height (amount) of molten zinc for plating inside the container, the block portions of the conductive block for flowing eddy currents are disposed at that position interposed between the core ends of an electromagnet where the magnetic flux density abruptly changes, causing a vortical flow to the molten zinc. In addition, the opening of the container is provided inwardly of, and apart from, the block portions of the conductive block, thereby minimizing a vertical component of the flow that impedes the stable retention of the molten zinc in the container. To control the temperature of the molten metal within the control limit necessary for ensuring the quality of plating, moreover, molten zinc in the vicinity of the opening at an increased temperature due to Joule heating is forcibly circulated. For this purpose, an inlet pipe and an outlet pipe are provided on a side wall of the container inwardly of the conductive block.

According to the present invention, the height and temperature of molten zinc in the container can be kept appropriate, so that a zinc plating stable in quality can be accomplished.

The present invention also provides continuous zinc plating facilities, comprising a heat treating device for applying heat treatment to a steel strip; a plating apparatus for applying molten zinc plating to the strip after treatment by the heat treating device; and an alloying device for applying treatment to the strip plated by the plating apparatus;

The plating apparatus comprising a container for storing molten zinc, and for allowing the strip to be continuously passed upward through an opening at the bottom thereof; a magnetic field generating means for generating a horizontal magnetic field in a lower part of the molten zinc in the container; and a conductive block constructed such that eddy currents induced in the molten zinc flow outside the molten zinc.

The present invention also provides a method for holding molten metal in a container having an opening at the bottom thereof. This method generates a horizontal magnetic field in a lower part of the molten metal to exert an electromagnetic force on the molten metal, thereby holding the molten metal in an aerial state. The method also guides part of eddy currents induced in the molten metal so as to flow outside the molten metal, thereby diminishing a downward force acting on the molten metal, and suppressing the generation of Joule heat.

The present invention further provides a molten zinc plating method which comprises generating a horizontal magnetic field in a lower part of molten zinc, through which a steel strip is continuously passed from below to above, in order to hold the molten zinc in a container; and guiding part of eddy currents induced in the molten zinc to flow outside the molten zinc.

DESCRIPTION OF THE PREFERRED EMBODIMENTS

First embodiment

Figure 1:
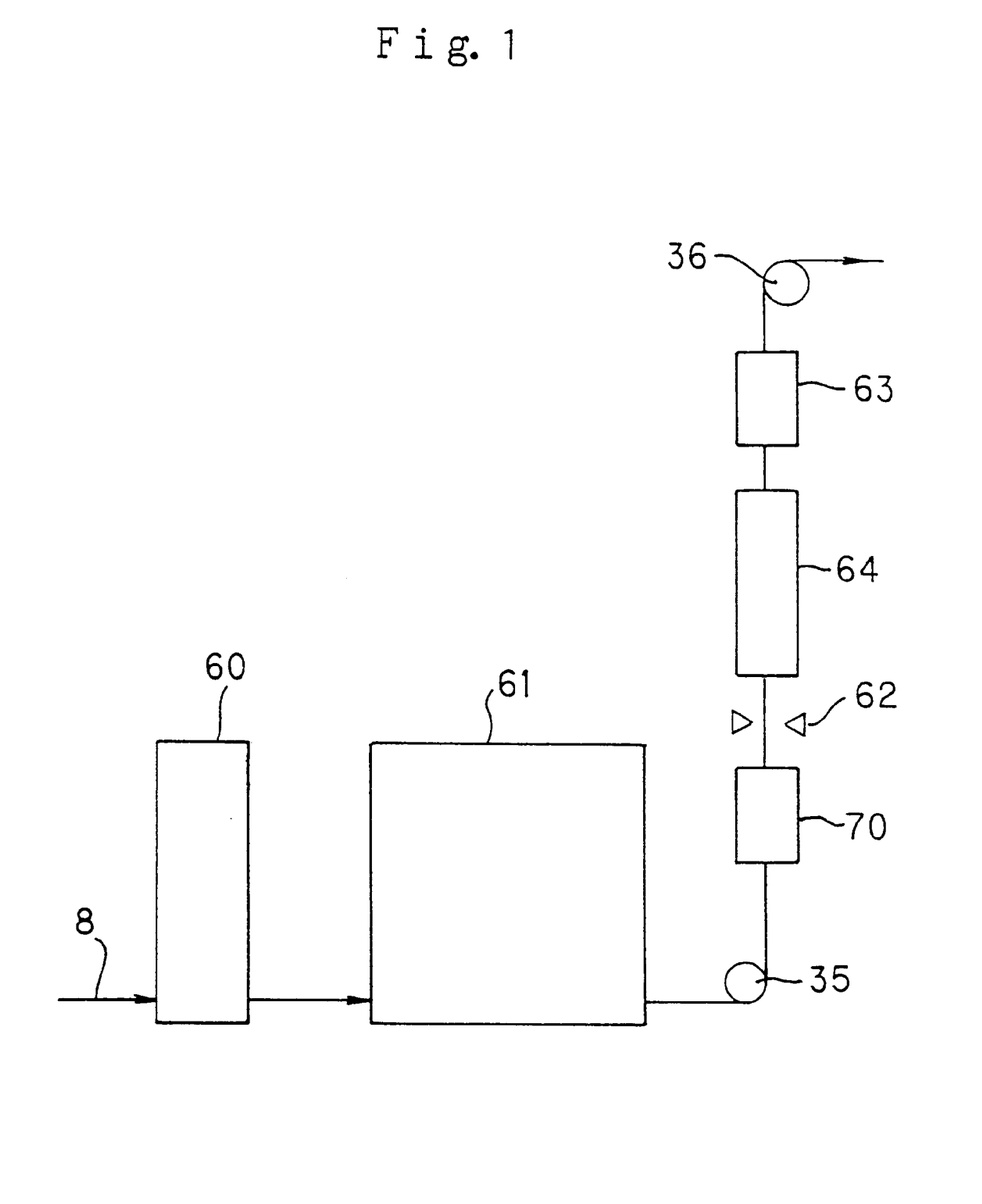
FIG. 1 is a block diagram of plating facilities with an apparatus for holding molten metal.

Continuous plating facilities, an example of application of the present invention, will be described. In FIG. 1, a steel strip 8, a material to be plated, which has been paid out by a paying device (not shown), is subjected to pretreatment, such as washing or degreasing, by pretreatment facilities 60 prior to plating. Then, the pretreated strip 8 is passed through an annealing furnace 61 composed of a heating zone, a scorching heat zone, and a cooling zone. Then, the annealed strip 8 is directed upwards by a guide drum 35 to enter a plating apparatus 70, where it is plated. The plated strip 8 is adjusted to a predetermined amount of plating by a coating thickness controller 62, and then cooled by a cooling device 63. After being changed in direction to a horizontal direction by a guide drum 36, the strip 8 is wound up by a winding device (not shown). In the facilities described here, an alloying furnace 64 may be provided between the coating thickness controller 62 and the cooling device 63.

Figure 2:
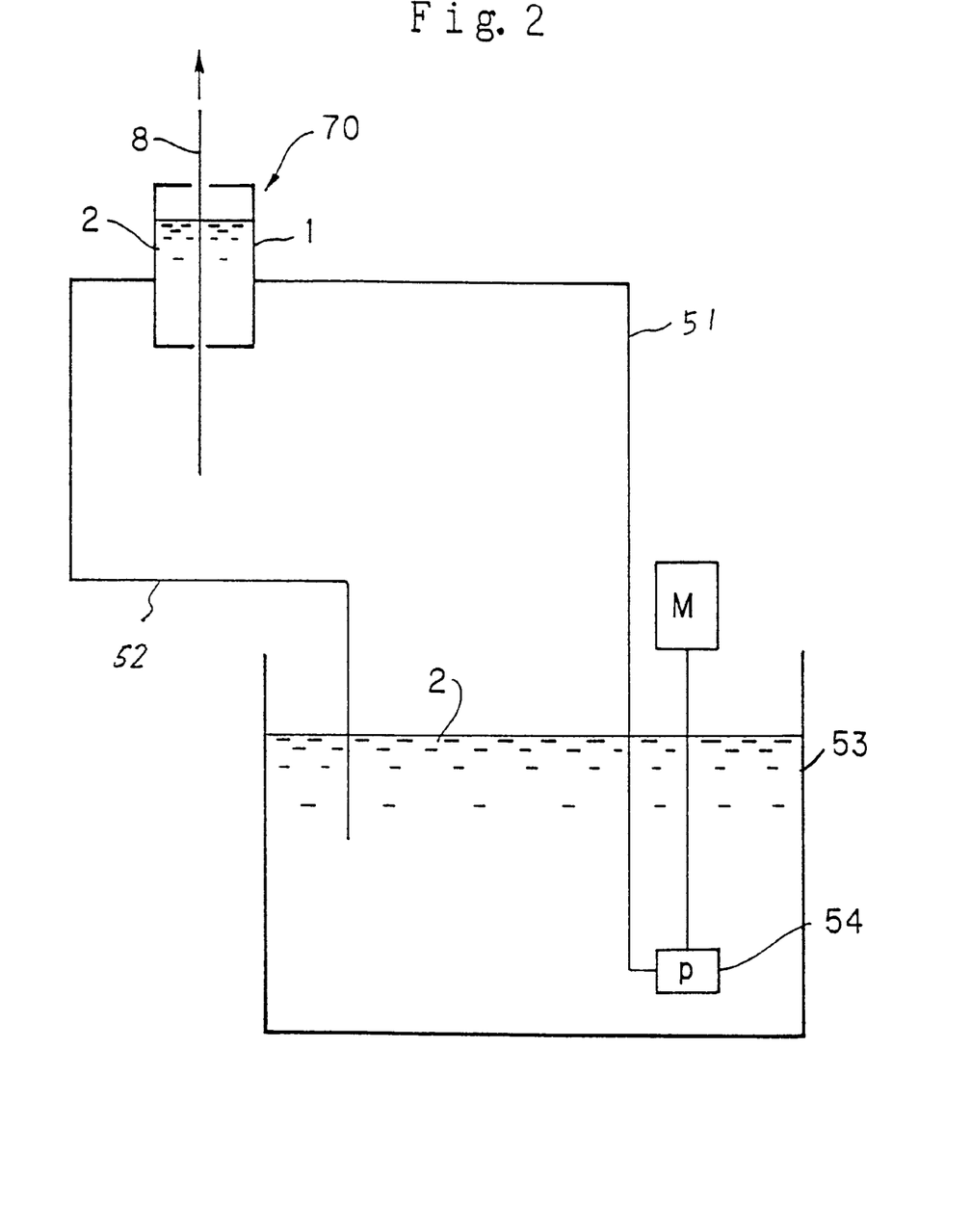
FIG. 2 is a schematic view of a plating apparatus as the apparatus for holding molten metal.

The plating apparatus 70, as shown in FIG. 2, stores molten metal (molten zinc) 2, a metal for plating, in a container 1. The container 1 is supplied with molten metal 2 by an electromagnetic pump 54 through a feed piping 51 from a reservoir 53 where molten metal 2, a hot dipping material, is stored in a thermostated condition. The molten metal 2 in the container 1 is returned to the reservoir 53 by gravity through a discharge piping 52.

The plating apparatus 70 of the present invention will be described with reference to FIGS. 3, 4 and 5.

A widthwise central part of the bottom of the container 1 that holds molten metal (conductive liquid) 2 constituting a plating bath has a protrusion 1a which protrudes downward. At a central part of the protrusion 1a, there is formed a slit-like opening 3 for passage of the strip 8, the material to be plated. On both sides of the protrusion 1a, cores 11 of an electromagnet are provided in contact with the side surfaces of the protrusion 1a and the bottom surface of the container 1. In FIG. 5, portions, 11a, indicated by broken lines are the ends of the cores 11. The cores 11 are wrapped with a coil, and the coil is connected to an alternating current source, although this is not shown.

Figure 6:
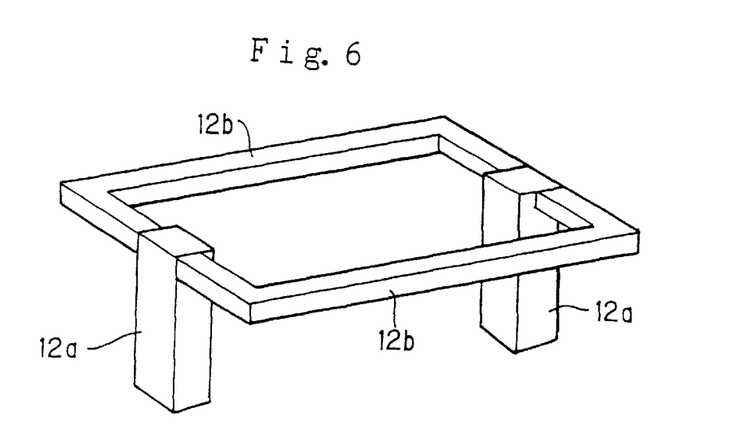
FIG. 6 is a perspective view of an example of a conductive block.

Inside the container 1, a conductive block 12 is provided. The conductive block 12, as shown in FIG. 6, consists of opposite block portions 12a, and a connecting portion 12b which connects together these block portions 12a at their upper parts. The connecting portion 12b is divided into two components because a space for passage of the strip 8 must be secured at the middle of the area defined by the block portions 12a and connecting portion 12b. In this embodiment, the connecting portion 12b is formed not only as a frame, but as a closure for the container 1.

The conductive block 12 is provided such that its block portions 12a extend along the opposite inner wall surfaces of the container 1 and their lower ends are fitted into the protrusion 1a so that the block portions 12a will be situated at sites where the horizontal magnetic field by the electromagnet will suddenly change, namely, in the gap between the ends 11a of the cores 11. The opening 3 at the bottom of the container 1 through which the strip 8 is passed lies inwardly and away from the block portions 12a of the conductive block 12.

At a central part of the connecting portion 12b (the part corresponding to the opening 3) of the conductive block 12 which concurrently serves as the closure for the container 1, an opening 13 is provided for passage of the strip 8, the material to be plated.

On the side surfaces of the container 1, near the block portions 12a of the conductive block 12, and on the opening 3 side, inlet pipes 14 and outlet pipes 15 for molten metal 2 are provided. The inlet pipes 14 are disposed nearly opposite each other, just as are the outlet pipes 15. The aforementioned supply piping 51 is connected to the inlet pipes 14, while the discharge piping 52 is connected to the outlet pipes 15.

In the apparatus for holding molten metal of the foregoing constitution, molten metal flowing into the container 1 through the inlet pipes 14 is held stably at the opening 3 by an electromagnetic force produced by a horizontal magnetic field and the induced eddy currents I. Thus, the Joule heated molten metal 2 goes out of the system through the outlet pipes 15 without leaking. The molten metal 2 cooled outside the system is fed again into the container 1 through the inlet pipes 14. In FIGS. 3 and 4, the part designated by 17 is the Joule heated portion.

Figure 8:
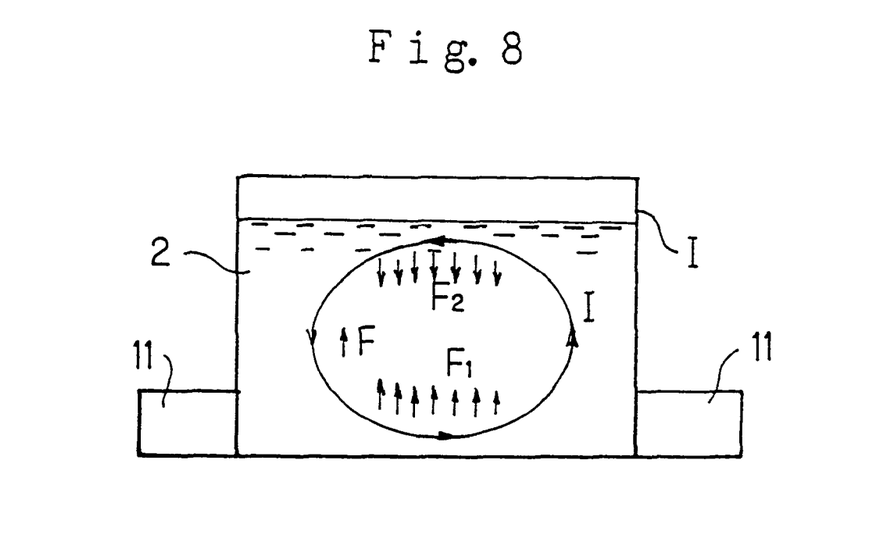
FIG. 8 is an explanatory drawing showing the induction of eddy currents in the absence of the conductive block.

As shown in FIG. 8, when an alternating current magnetic field is applied to molten metal 2 in the container 1, the eddy currents I occur, and the forces F1 and F2 develop based on the eddy currents I and the AC magnetic field in accordance with the Fleming's rules. In this case, the force F2 becomes a downward force, since the eddy currents flow there in the reverse direction. Thus, the force F that holds the molten metal 2 is (F1–F2). To compensate for the force corresponding to F2, it is necessary to apply a surplus current, i.e., an AC magnetic field. Because of Joule heat due to this surplus current, the molten metal 2 is further heated.

Figure 7:
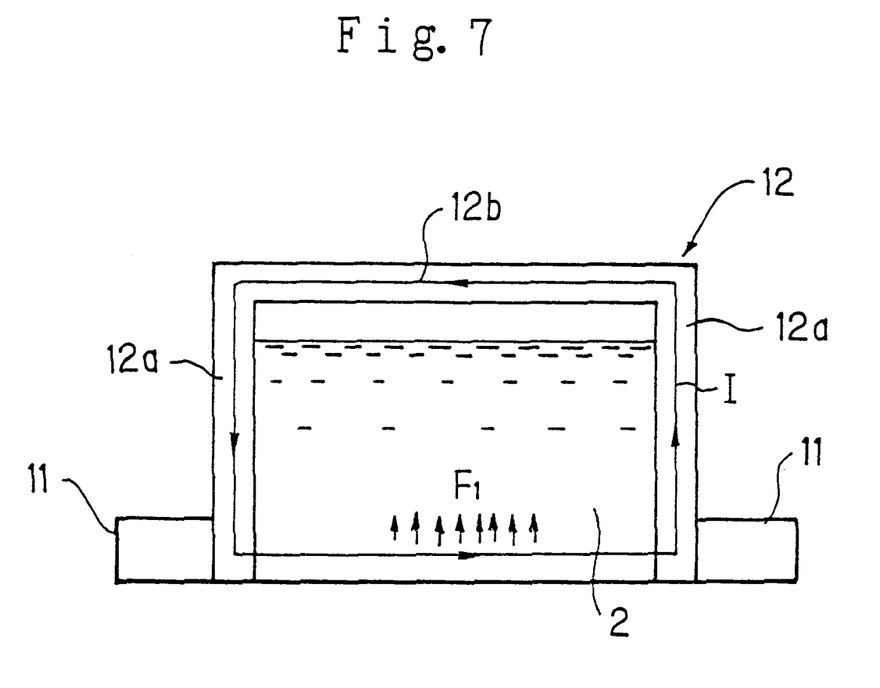
FIG. 7 is an explanatory drawing showing the flow of electric currents in the conductive block.

In the present invention, however, the conductive block 12 is disposed in the container 1 to construct a closed circuit for flowing outside the molten metal 2, as illustrated in FIG. 7. Thus, part of the eddy currents flow outside the molten metal 2, and do not give rise to the downward force F2. Hence, the electric currents flowing in the molten metal 2 can be decreased by the amount of currents corresponding to F2, and heat generation by Joule heat becomes less. This enables the temperature rise of the molten metal 2 to be suppressed, and maintain a sufficient height of molten metal 2.

Furthermore, the inlet pipes 14 and the outlet pipes 15 of for molten metal 2 are provided inwardly of the block portions 12a of the conductive block 12 and outwardly of the opening 3. Thus, molten metal 2 Joule heated at the core 11 regions can be circulated without being interrupted by the block portions 12a. Consequently, molten metal 2 can be cooled outside the cores 11 without disturbing the stable retention of the molten metal 2. Accordingly, the temperature of molten metal 2 can be kept optimal for ensuring the quality of plating.

As stated earlier, the block portions 12a of the conductive block 12 are arranged at that position interposed between the ends 11a of the cores 11 where the magnetic flux density markedly varies. As a result, the occurrence of a vortical flow which impedes the stable holding of molten metal 2 can be prevented, and the Joule heated molten metal 2 can be cooled outside the system. Even in the presence of large eddy currents I by the cores 11, the temperature of the molten metal 2 can be kept within the necessary control limit for ensuring the quality of plating, and the height of the molten metal 2 can be held at a level necessary for plating.

Second embodiment

Figure 9:
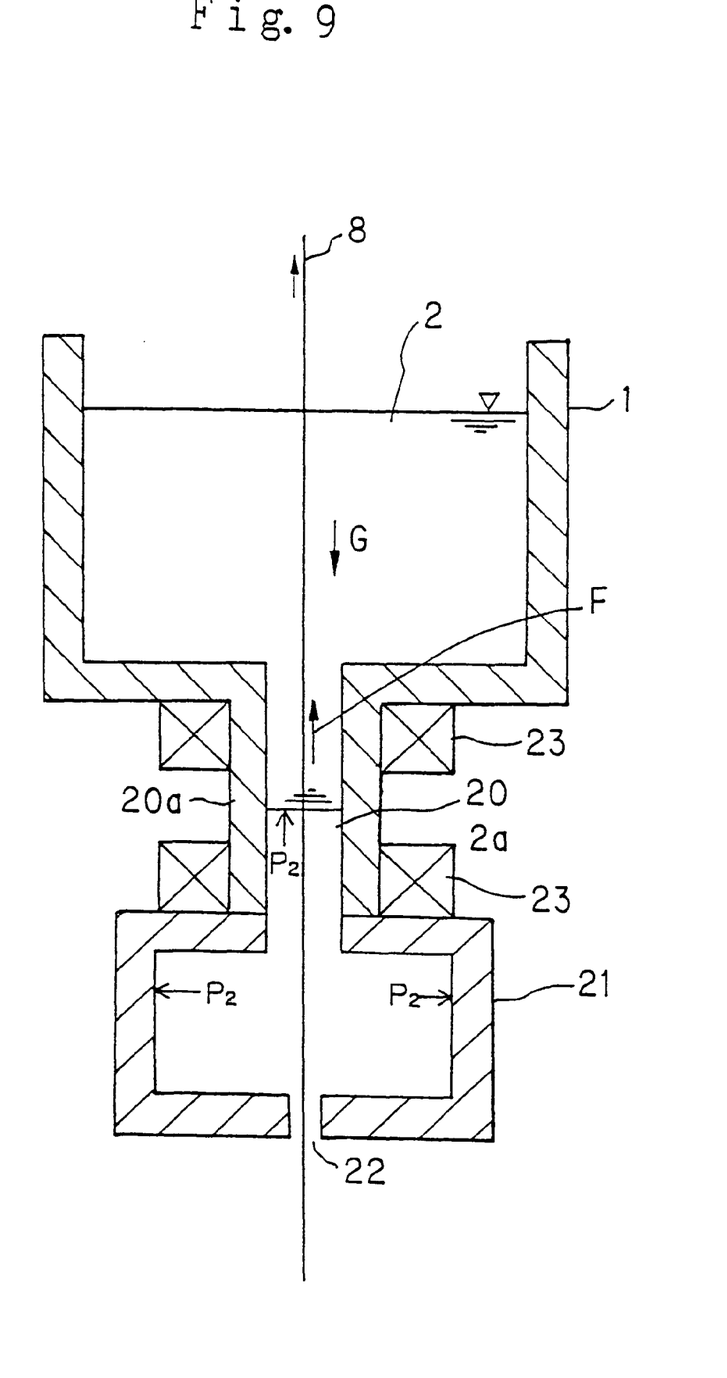
FIG. 9 is a longitudinal sectional view of the apparatus for holding molten metal related to another embodiment of the present invention.

In FIG. 9, a rectangular opening 20 for passage of a steel strip 8, a material to be plated, is formed at the bottom of a container 1 where molten plating metal 2 such as zinc or aluminum is stored. This opening 20 is extended downward by an opening forming portion 20a integrally connected to the container 1. The transverse section of the opening forming portion 20a, as viewed from top, is in a rectangular shape. To the lower end of the opening forming portion 20a, a pressure chamber 21 is connected. At the lower end of the pressure chamber 21, a slit 22 for passing the strip 8 is formed. The pressure chamber 21 is equipped with a gas feed means and a piping for gas supply. The gas pressure inside the pressure chamber 21 can be controlled. The gas feed means, etc. are the same as conventional means, and are not shown in the drawing.

On the outside of the opening forming portion 20a, a coil 23 is provided as a magnetic field generating means. A power source means (not shown) is connected to the coil 23. In short, an electromagnet is constructed with the opening forming portion 20a as the iron core.

Figure 10:
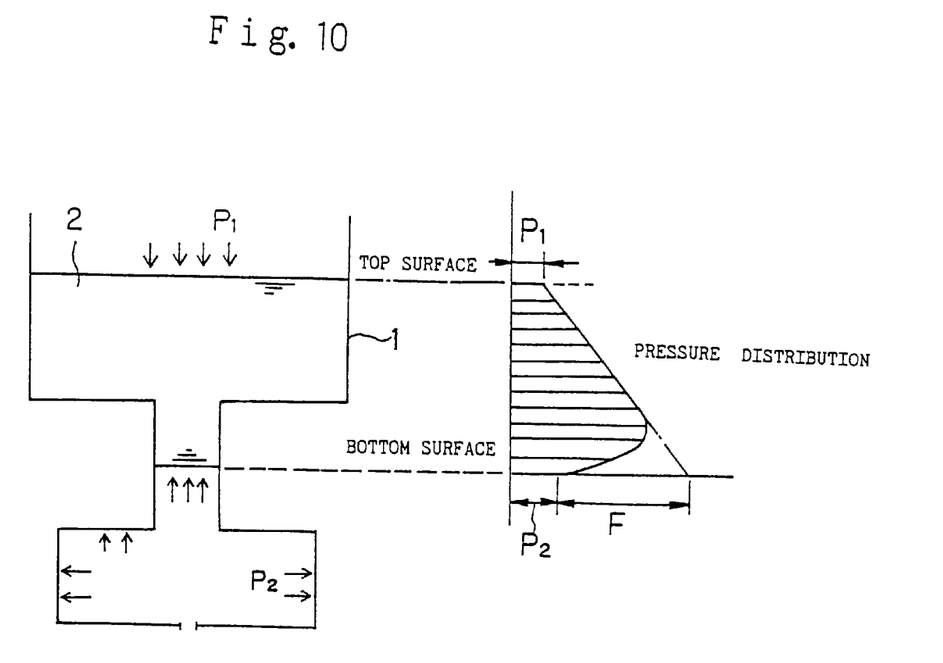
FIG. 10 is an explanatory drawing for the actions and effects of the apparatus shown in FIG. 9.

In the apparatus of this structure, when an electric current is passed through the coil 23 located near the bottom of molten metal 2 to apply an alternating current magnetic field to the opening forming portion 20a, an electromagnetic force (Lorentz force) F occurs in the molten metal 2 in a direction opposite to the direction of gravity G. The distribution of pressure within the molten metal 2 is as shown in FIG. 10. At the bottom surface of the molten metal 2, a force exerted by the weight of the molten metal 2 undergoing the force F balances with the gas pressure P2 inside the pressure chamber 21. P1 represents a pressure which acts on the liquid surface of the molten metal 2.

Figure 11:
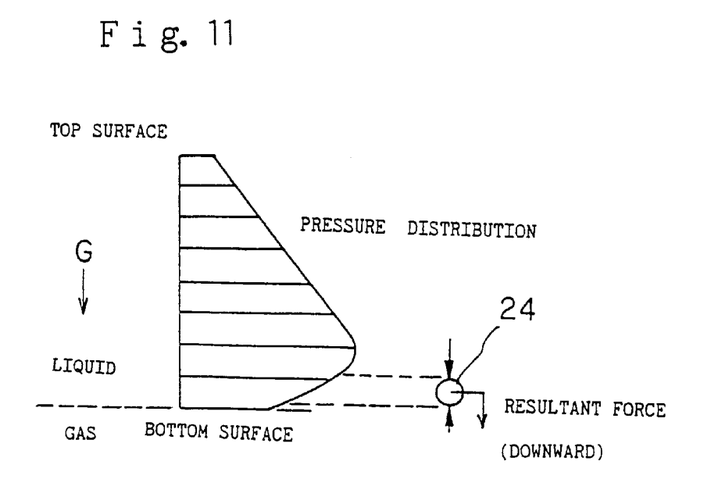
FIG. 11 is an explanatory drawing for the actions and effects of the apparatus shown in FIG. 9.

In this condition, if a gas bubble 24 is about to enter the molten metal 2, a downward force acts on the gas bubble 24, as illustrated in FIG. 11, that pushes it back downward, so that the gas bubble 24 is clearly unable to enter the molten metal 2. By increasing the pressure of the gas, therefore, the position of the bottom surface 2a of the molten metal 2 can be raised, thereby increasing the height of the molten metal 2.

In the foregoing embodiment, the coil 23 has been employed as the magnetic field generating means to produce a horizontal magnetic field. It is permissible, however, to use a linear motor, thereby generating a shifting magnetic field to develop Lorentz force.

Third embodiment

Figure 12:
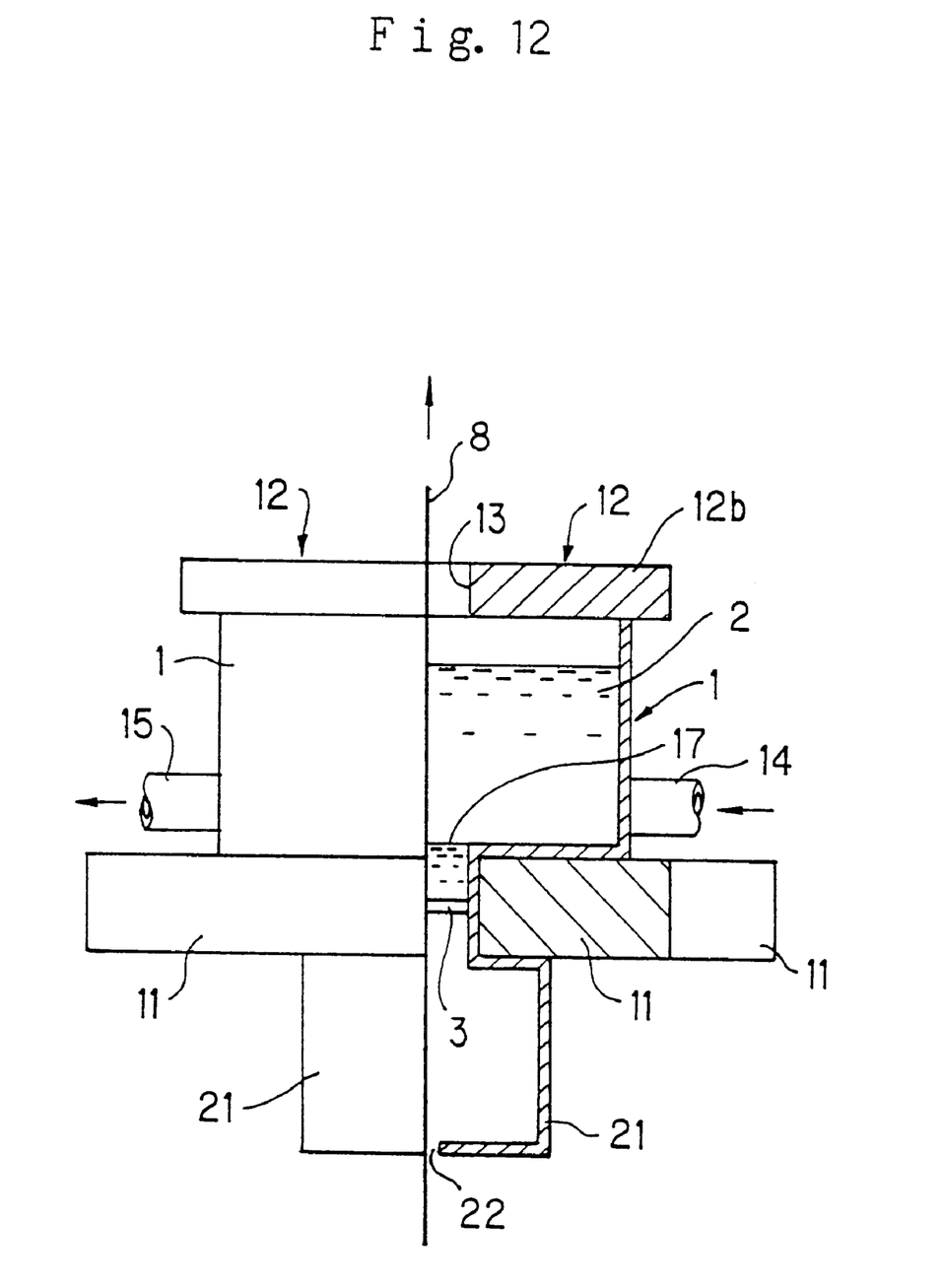
FIG. 12 is a longitudinal sectional view of the apparatus for holding molten metal related to still another embodiment of the present invention.

In FIG. 12, a widthwise central part of the bottom of the container 1 that holds molten metal (molten zinc) 2 constituting a plating bath is a protrusion 1a which protrudes downward. At a central part of the protrusion 1a, an opening 3 for passage of a steel strip 8, a material to be plated, is formed. On both sides of the protrusion 1a, cores 11 of an electromagnet are provided in contact with the side surfaces of the protrusion 1a and the bottom surface of the container 1. The cores 11 are wrapped with a coil, and the coil is connected to an alternating current source.

Figure 3:
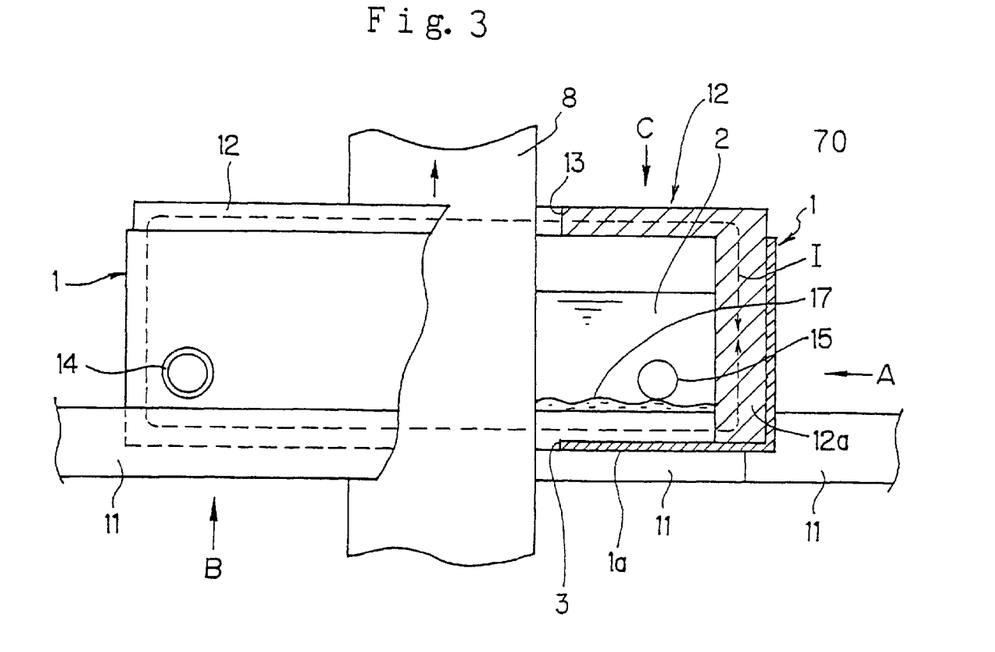
FIG. 3 is a partly sectional side view of the apparatus for holding molten metal related to an embodiment of the present invention.
Figure 4:
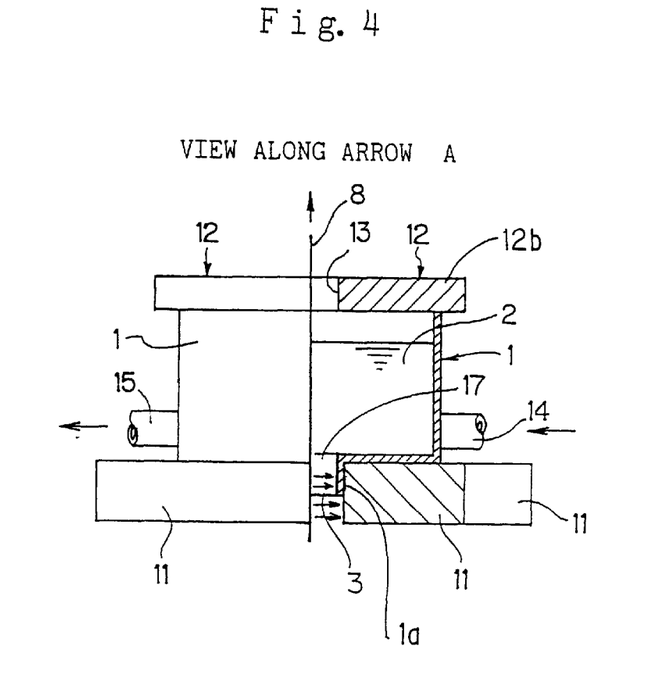
FIG. 4 is a view of the apparatus for holding molten metal as seen in the direction of an arrow A in FIG. 3.
Figure 5:
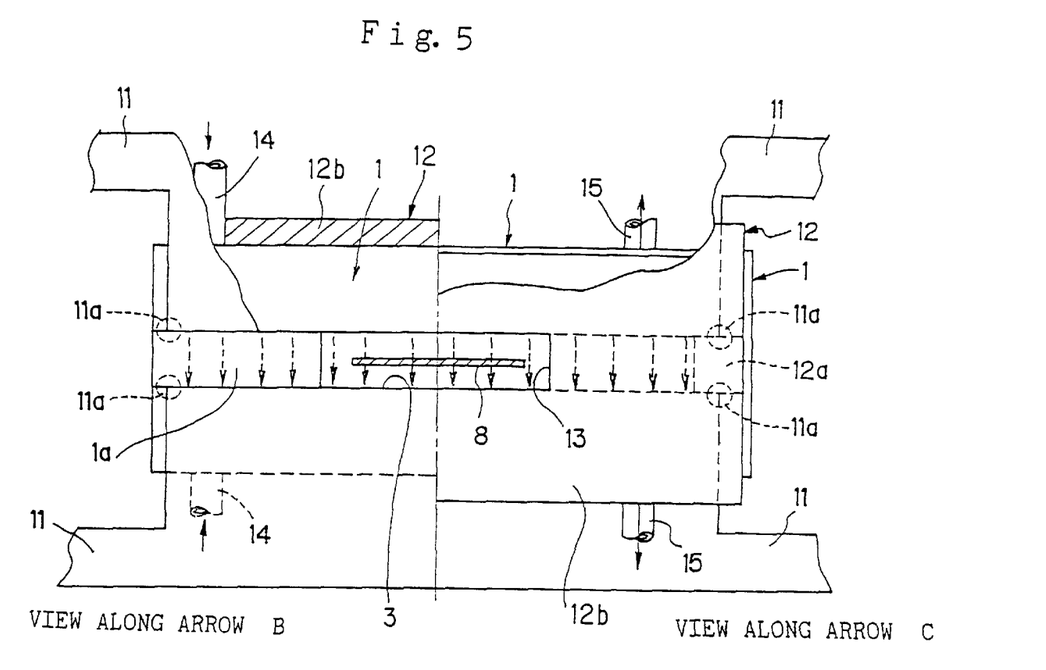
FIG. 5 is a view of the apparatus for holding molten metal shown in FIG. 3, as seen in the direction of an arrow B (from bottom) and an arrow C (from top)

Inside the container 1, a conductive block 12 is provided as in the embodiment shown in FIGS. 3, 4 and 5. The conductive block 12, as shown in FIG. 6, consists of opposite block portions 12a, and a connecting portion 12b which connects together these block portions 12a at their upper parts. The reason why the connecting portion 12b is divided into two components is that a space for passage of the strip 8 must be secured at the middle of the area defined by the block portions 12a and connecting portion 12b. In this embodiment, the connecting portion 12b is formed not only as a frame, but as a closure for the container 1.

The conductive block 12 is provided such that its block portions 12a extend along the opposite inner wall surfaces of the container 1 and their lower ends are fitted into the protrusion 1a so that the block portions 12a will be situated at that site between the ends of the cores 11 where a horizontal magnetic field by the electromagnet will suddenly change. At a central part of that connecting portion 12b (the part corresponding to the opening 3) of the conductive block 12 which concurrently serves as a closure for the container 1, an opening 13 is provided for passage of the strip 8, the material to be plated. On the side surfaces of the container 1, near the block portions 12a of the conductive block 12, and on the opening 3 side, inlet pipes 14 and outlet pipes 15 for molten metal 2 are provided. The inlet pipes 14 are disposed nearly opposite each other, just as are the outlet pipes 15. Other constituents of the illustrated structure are the same as shown in FIGS. 3, 4 and 5.

A pressure chamber 21 is constructed as a connection to the protrusion 1a at the bottom of the container 1. At the lower end of the pressure chamber 21, a slit 22 for passing the strip 8 is formed. The pressure chamber 21 is equipped with a piping for gas supply and a gas feed means. The gas pressure inside the pressure chamber 21 can be controlled. The gas feed means, etc. are the same as conventional means, and omitted in the drawing.

In this apparatus for holding molten metal, molten metal 2 in the container 1 is held by the electromagnetic force which is generated by the horizontal magnetic field produced by passing an electric current through the coil, and the induced eddy currents, and the pressure which is imposed on the bottom surface of the molten metal 2 from within the pressure chamber 21. Since part of the eddy currents developed are passed into the conductive block 12, a downward force on the molten metal 2 is diminished (see FIGS. 7 and 8). Thus, the amount of electric current for holding the molten metal 2 can be decreased, and the heat generation of the molten metal 2 by Joule heat can also be suppressed. Furthermore, the gas bubbles can be prevented from penetrating the molten metal 2.

We claim:

1. An apparatus for holding molten metal, comprising:

magnetic field generating means for generating a horizontal magnetic field in a lower part of molten metal accommodated in a container to hold the molten metal in the container by an electromagnetic force; and a conductive block consisting of block portions provided at sites where the horizontal magnetic field generated by the magnetic field generating means abruptly changes, and a connecting portion for connecting together the block portions outside the molten metal; wherein eddy currents induced in the molten metal flow outside the molten metal by passing through the block portions and connecting portion of the conductive block.

2. The apparatus for holding molten metal of claim 1, including a pressure chamber for holding a gas for imparting pressure to the bottom surface of the molten metal in the container, said pressure chamber being connected to the bottom of the container, wherein an opening is formed between the container and the pressure chamber at a point of contact between the container and the pressure chamber.

3. An apparatus for holding molten metal, comprising:

a container for accommodating molten metal, said container having an opening for passage of a material at the bottom thereof;

an electromagnet disposed at a lower part of the container to generate a horizontal magnetic field in a lower part of the molten metal;

a conductive block comprising block portions provided in the container and close to the ends of cores of the electromagnet, and a connecting portion for connecting together the block portions outside the molten metal; and a pressure chamber connected to said opening at the bottom of the container to accommodate a gas for imparting pressure to the bottom surface of the molten metal.

4. An apparatus for holding molten metal, comprising:

a container for storing molten metal, said container having an opening at the bottom thereof;

magnetic field generating means for generating a horizontal magnetic field in a lower part of the molten metal to exert an electromagnetic force on the molten metal in the container, thereby holding the molten metal;

a conductive block having block portions at those sites in the container where the horizontal magnetic field generated by the magnetic field generating means abruptly changes, such that eddy currents are guided while flowing outside the molten metal; and an inlet portion and an outlet portion for the molten metal, said inlet and outlet portions being provided in the container outwardly of the opening and inwardly of the block portions of the conductive block.

5. A molten zinc plating apparatus, comprising:

a container for storing molten zinc as molten metal, and for allowing a steel strip to be continuously passed upward through a slit provided at the bottom thereof;

magnetic field generating means for generating a horizontal magnetic field in a lower part of the molten zinc to hold the molten zinc in the container by an electromagnetic force; and a conductive block consisting of block portions provided at sites where the horizontal magnetic field generated by the magnetic field generating means abruptly changes, and a connecting portion for connecting together the block portions outside the molten metal; wherein eddy currents induced in the molten zinc flow outside the molten zinc by passing through the conductive block.

6. The molten zinc plating apparatus of claim 5, including a pressure chamber connected to said slit at the bottom of the container to hold a gas for imparting pressure to the bottom surface of the molten metal in the container.

7. Continuous zinc plating facilities, comprising:

a heat treating device for applying heat treatment to a steel strip;

a plating apparatus for applying molten zinc plating to the strip after treatment by the heat treating device; and an alloying device for applying alloying treatment to the strip plated by the plating apparatus; wherein said plating apparatus includes:

a container for storing molten zinc, and for allowing the strip to be continuously passed upward through an opening provided at the bottom thereof;

magnetic field generating means for generating a horizontal magnetic field in a lower part of the molten zinc in the container; and a conductive block constructed such that eddy currents induced in the molten zinc flow outside the molten zinc.

8. A method for holding molten metal in a container having an opening at the bottom thereof, said method involving generating a horizontal magnetic field in a lower part of the molten metal to exert an electromagnetic force on the molten metal, thereby holding the molten metal in an aerial state; and guiding part of eddy currents induced in the molten metal so as to flow outside the molten metal by passing through block portions, which are provided at sites where the horizontal magnetic field abruptly changes, and which are connected together outside the molten metal, such that a downward force acting on the molten metal is diminished and the generation of Joule heat is suppressed.

9. A molten zinc plating apparatus for generating a horizontal magnetic field in a lower part of molten zinc in a container having an opening at the bottom thereof, such that the molten zinc is hold without its leakage from the opening of the container; and allowing a strip to be passed continuously from below to above through the opening; said apparatus including a core wrapped with a coil connected to an alternating current source for generating the horizontal magnetic field in the lower part of the molten metal, said container having a widthwise central part across the length of the container having a protrusion that protrudes downward, said protrusion having a slit-like opening at a lengthwise central part thereof for allowing the strip to pass therethrough, a conductive block consisting of block portions provided by being fitted into both ends of the protrusion of the container corresponding to the ends of the core where the horizontal magnetic field generated by the cores abruptly changes, and a connecting portion for connecting together the block portions outside the molten zinc, and a device for circulating the molten zinc in the container to the outside of the container.

* * * * *